(12) United States Patent
Chaput et al.

(10) Patent No.: US 11,365,157 B2
(45) Date of Patent: Jun. 21, 2022

(54) METHOD FOR MANUFACTURING PIECES MADE OF CERAMIC MATERIAL BY THE TECHNIQUE OF ADDITIVE MANUFACTURING

(71) Applicant: S.A.S. 3DCeram-Sinto, Limoges (FR)

(72) Inventors: Christophe Chaput, Le Palais-sur-Vienne (FR); Richard Gaignon, Saint-Vrain (FR)

(73) Assignee: S.A.S. 3DCERAM-SINTO, Bonnac la Cote (FR)

( * ) Notice: Subject to any disclaimer, the term of this patent is extended or adjusted under 35 U.S.C. 154(b) by 688 days.

(21) Appl. No.: 16/216,113

(22) Filed: Dec. 11, 2018

(65) Prior Publication Data

US 2019/0177239 A1 Jun. 13, 2019

(30) Foreign Application Priority Data

Dec. 11, 2017 (FR) ...................................... 1771338

(51) Int. Cl.
*C04B 35/64* (2006.01)
*B28B 1/00* (2006.01)
(Continued)

(52) U.S. Cl.
CPC ................ *C04B 35/64* (2013.01); *B22C 9/10* (2013.01); *B28B 1/001* (2013.01); *B28B 7/248* (2013.01);
(Continued)

(58) Field of Classification Search
CPC ..... C04B 35/64; C04B 35/565; C04B 35/581; C04B 35/111; C04B 35/447;
(Continued)

(56) References Cited

U.S. PATENT DOCUMENTS 7,343,960 B1 * 3/2008 Frasier .................. B22D 47/00
164/133
10,850,450 B2 * 12/2020 Nauka .................. B29C 64/386
(Continued)

FOREIGN PATENT DOCUMENTS

JP    2005-523819 A    8/2005
JP    2015009495 A    1/2015
(Continued)

OTHER PUBLICATIONS

Machine Translation of JP-2016221894-A (Year: 2016).*
(Continued)

*Primary Examiner* — Leith S Shafi
(74) *Attorney, Agent, or Firm* — Nixon & Vanderhye

(57) ABSTRACT

On a working platform of a stereolithography machine, is manufactured, by the technique of additive manufacturing, simultaneously but separately, from a same pasty photocurable ceramic composition: a green assembly made up of a support of the green piece and of the green piece on the support, the free surface of the latter imprinted by a first face of the green piece; and a green ceramic shaper whose free surface bears the imprint of a second face of the green piece opposed to the first face; in a kiln, is placed, on the green shaper thus obtained with its imprint turned upwards, the green assembly thus obtained with its green piece turned downwards in order for it to be received in the imprint of the shaper, and the green piece thus held between the shaper and the support is subjected to debinding and to sintering.

17 Claims, 5 Drawing Sheets

(51) Int. Cl.
*B29C 64/124* (2017.01)
*B33Y 10/00* (2015.01)
*B22C 9/10* (2006.01)
*C04B 35/565* (2006.01)
*C04B 35/581* (2006.01)
*C04B 35/111* (2006.01)
*C04B 35/447* (2006.01)
*C04B 35/185* (2006.01)
*C04B 35/48* (2006.01)
*C04B 35/195* (2006.01)
*C04B 35/14* (2006.01)
*B28B 7/24* (2006.01)
*B28B 7/34* (2006.01)
*C04B 35/119* (2006.01)
*C04B 35/584* (2006.01)
*C04B 35/622* (2006.01)
*C04B 35/486* (2006.01)
*B33Y 80/00* (2015.01)
*B33Y 30/00* (2015.01)
*B33Y 40/00* (2020.01)
*B33Y 70/00* (2020.01)

(52) U.S. Cl.
CPC ............ *B28B 7/342* (2013.01); *B29C 64/124* (2017.08); *C04B 35/111* (2013.01); *C04B 35/119* (2013.01); *C04B 35/14* (2013.01); *C04B 35/185* (2013.01); *C04B 35/195* (2013.01); *C04B 35/447* (2013.01); *C04B 35/481* (2013.01); *C04B 35/486* (2013.01); *C04B 35/565* (2013.01); *C04B 35/581* (2013.01); *C04B 35/584* (2013.01); *C04B 35/622* (2013.01); *B33Y 10/00* (2014.12); *B33Y 30/00* (2014.12); *B33Y 40/00* (2014.12); *B33Y 70/00* (2014.12); *B33Y 80/00* (2014.12); *C04B 2235/6026* (2013.01); *C04B 2235/96* (2013.01); *C04B 2235/9615* (2013.01)

(58) Field of Classification Search
CPC ................ C04B 35/185; C04B 35/481; C04B 35/195; C04B 35/14; C04B 35/119; C04B 35/584; C04B 35/622; C04B 35/486; C04B 2235/96; C04B 2235/6026; C04B 2235/9615; C04B 35/00; B28B 7/248; B28B 7/342; B28B 1/001; B29C 64/124; B29C 64/10; B29C 64/40; B22C 9/10; B33Y 80/00; B33Y 10/00; B33Y 30/00; B33Y 40/00; B33Y 70/00; B33Y 50/00; Y02P 10/25

See application file for complete search history.

(56) References Cited

U.S. PATENT DOCUMENTS

| 2003/0043360 | A1* | 3/2003 | Farnworth | B33Y 50/02 |
| | | | | 355/77 |
| 2003/0062145 | A1 | 4/2003 | Frasier et al. | |
| 2010/0028645 | A1* | 2/2010 | Maguire | B28B 11/248 |
| | | | | 428/221 |
| 2016/0368224 | A1* | 12/2016 | Ooba | B29C 64/153 |
| 2017/0232682 | A1* | 8/2017 | Alcantara Marte | B22F 10/40 |
| | | | | 264/497 |

FOREIGN PATENT DOCUMENTS

| JP | 2016102036 A | | 6/2016 |
| JP | 2016221894 A | * | 12/2016 |
| JP | 2017159644 A | | 9/2017 |
| JP | 2018505309 A | | 2/2018 |
| WO | WO 2016/113213 | | 7/2016 |

OTHER PUBLICATIONS

Office Action issued in Japanese Patent Application No. 2018-230729 dated Jul. 29, 2019.
French Search Report, FR1771338, dated Jun. 22, 2018.
Written Opinion, FR1771338, dated Jun. 22, 2018.

* cited by examiner

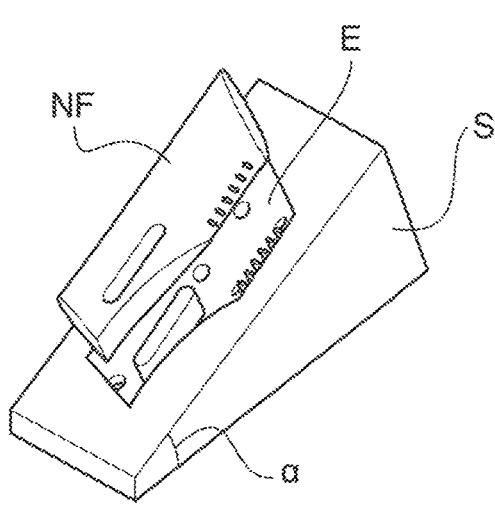 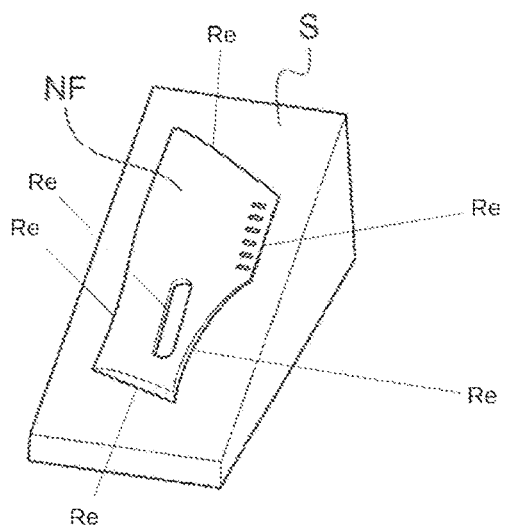
Fig.5　　　　　　　　Fig.6
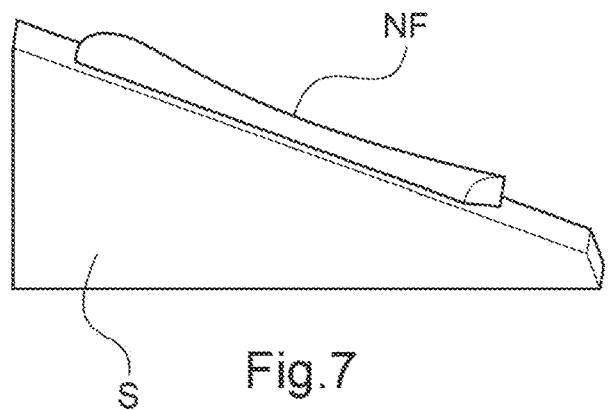
Fig.7
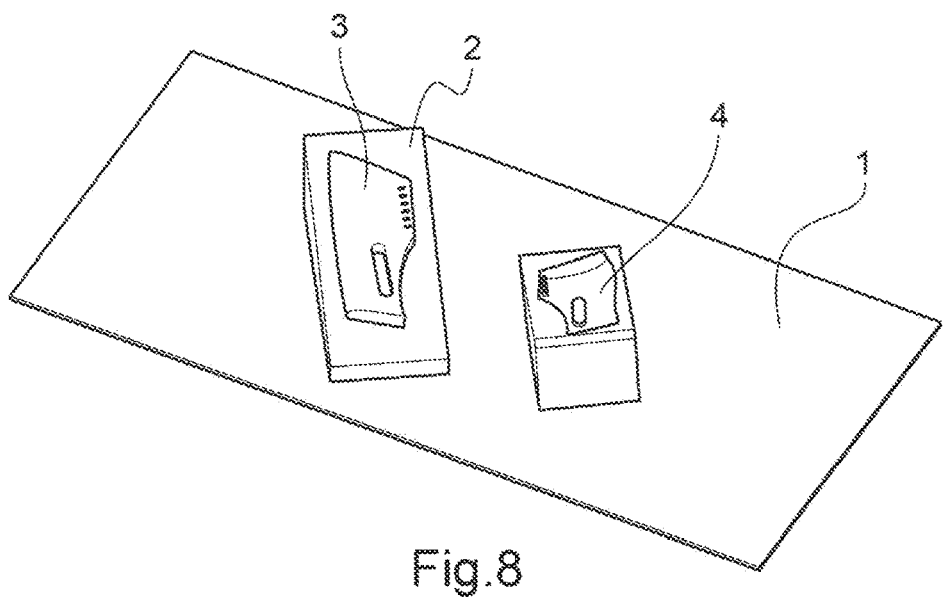
Fig.8

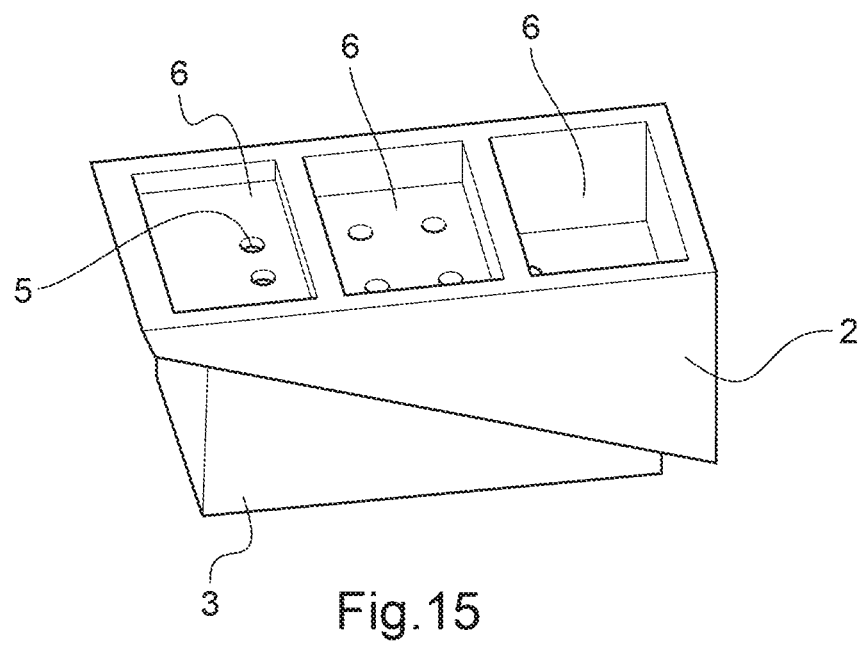
Fig.15
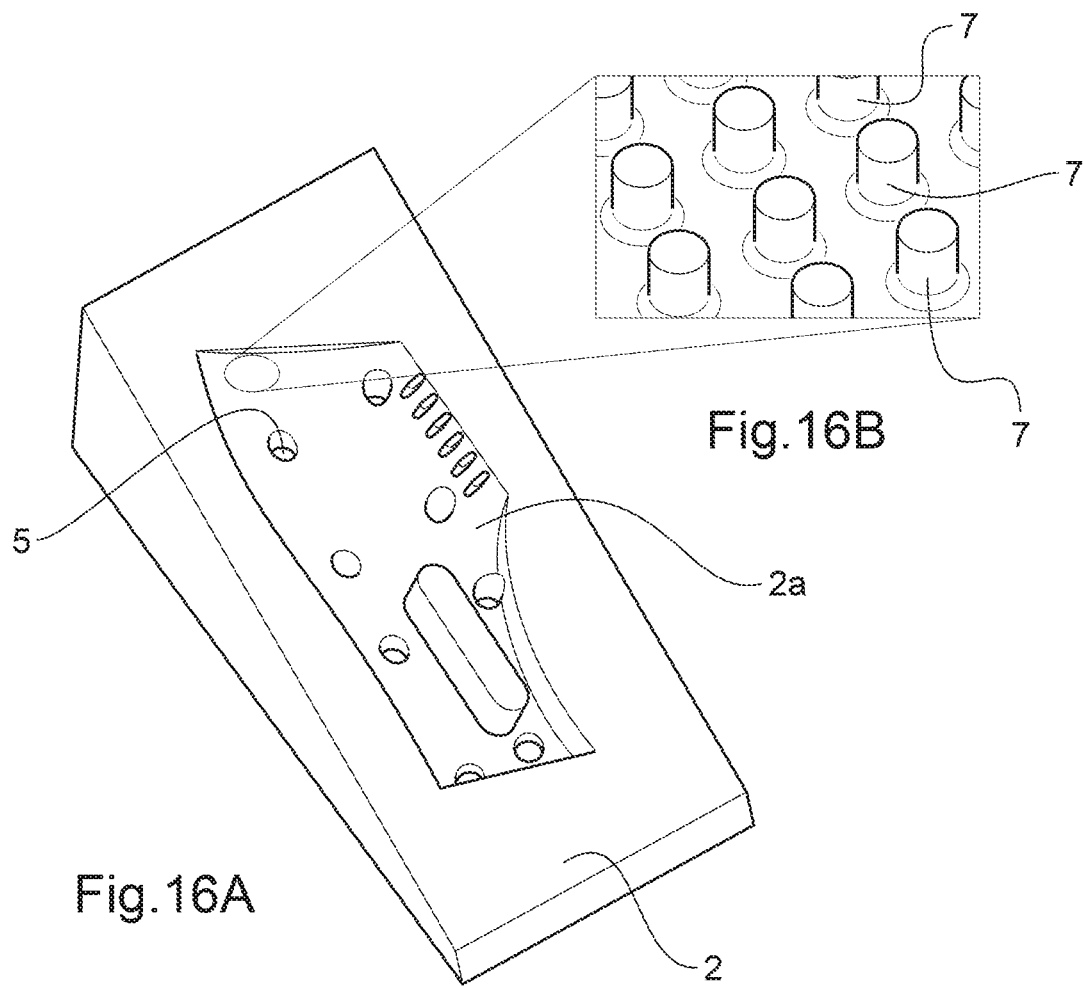
Fig.16B
Fig.16A

METHOD FOR MANUFACTURING PIECES MADE OF CERAMIC MATERIAL BY THE TECHNIQUE OF ADDITIVE MANUFACTURING

The present invention relates to a method for manufacturing pieces made of ceramic material by the technique of additive manufacturing, such green pieces being intended to be subjected to debinding and sintering operations so as to obtain finished ceramic pieces.

The technique of additive manufacturing, also called stereolithography, generally comprises the following steps, for obtaining such green pieces:

building, by computer-aided design, a computer model of the piece to be manufactured, the size of such a model being slightly larger than those of the piece to be manufactured so as to anticipate shrinking of the ceramic during the firing (debinding and sintering operations) of the piece; and manufacturing the piece by the technique of additive manufacturing, technique according to which:

on a working platform, a first layer of a photocurable composition generally comprising at least one ceramic material, at least one photocurable monomer and/or oligomer, at least one photoinitiator and, if necessary, at least one plasticizer and/or at least one solvent and/or at least one dispersant, is formed;

the first layer of the photocurable composition is caused to be cured by irradiation (by a laser scanning of the free surface of said layer or by a diode projection system) according to a pattern defined from the model for said layer, forming a first stage;

on the first stage, a second layer of the photocurable composition is formed;

the second layer of the photocurable composition is cured, by irradiation according to a pattern defined for said layer, forming a second stage, such an irradiation being carried out as for the first layer;

optionally, the aforementioned steps for obtaining the green piece are repeated.

Then, as mentioned above, to obtain the finished piece, the green piece is cleaned to remove the uncured composition; the cleaned green piece is debinded; and the cleaned and debinded green piece is sintered to obtain the finished piece.

In what follows, the prior art for manufacturing the ceramic pieces is described by referring to foundry cores, such foundry cores only representing one example of the ceramic pieces which can be manufactured by the method according to the invention.

State of the Art for Manufacturing Foundry Cores

The foundry cores can be manufactured while being in the upright position without any support (1), in the lying position without any support (2) or in an angled position on a support (3).

(1) The upright or high-position manufacturing allows to manufacture many foundry cores at the same time on the working platform of the stereolithography machine. To stabilize the cores in their upright position, it is necessary to modify them by attaching thereto backings made up of struts which should be removed afterwards after the sintering process by cutting them.

During the upright manufacturing, the core may become distorted/damaged easily under the paste scraping stress in the case of the manufacturing mode by pasty process. Such a risk is accentuated by the curling phenomenon according to which a flat surface bends as a result of an important laser power causing a too important crosslinking during the polymerization. The piece being manufactured is likely to tip over as the scraping device passes. The curling phenomenon is illustrated in FIG. 3 of the accompanying drawing:

In such a FIG. 3, in the left part, a scraping device R of the stereolithography machine is shown schematically, which scraping device spreads each of the layers of pasty photocurable ceramic material, as well as the foundry core NF being manufactured upright. The direction of the scraping is shown by the arrow F and the spread paste is symbolized by the horizontal dotted line. The location where the scraping stress should be applied is surrounded by the circle c1 and the one where the curling phenomenon should occur is surrounded by the circle c2.

The curling illustrated in FIG. 3, in the right part, results in the piece being manufactured tipping over as the scraping device R passes.

The upright manufacturing, which one gives the possibility to manufacture many cores at the same time, without the need of a support during the manufacturing, is therefore, for the aforementioned reasons, a long and risky manufacturing.

(2) The lying manufacturing is, by definition, less high than the upright manufacturing and, consequently, will require less time. Also, the number of backings to be added to the piece will be lower, even no backing will be needed.

However, the small gripping surface area of the foundry core being manufactured with the working platform of the stereolithography machine is likely to result in the core not gripping any more and sliding when being manufactured. This is what is illustrated by FIG. 4 of the accompanying drawing:

In such a FIG. 4, in the left part, as for FIG. 3, the foundry core NF is shown but, this time, when being manufactured in a lying position. In view of the small gripping surface area—symbolized by the circles c3 and c4 —, it can be seen—in the right part of FIG. 4—that the core NF is sliding with respect to its initial position.

(3) When manufacturing a core at an angle on a support, the latter, which comprises an upper face angled with respect to the platform of the stereolithography machine, is manufactured at the same time as the core. Because of such an inclination, the support stands the scraping stresses, neither tipping over nor sliding is observed unlike in the upright and lying manufacturing, respectively, and the manufacturing time is reduced compared to the upright manufacturing.

The surface of the support bears the imprint of a face of the foundry core, hence, this leads to few distortions during the manufacturing and to few backings bound to the core to be added.

The manufacturing is carried out with low laser power, especially less than 150 mW, hence, this leads to pieces with low rigidity and to no curling.

During the computer-aided design, in order to manufacture the support:

one of the faces of the core is transferred onto the angled surface of the support so as to create an imprint;

a shifting operation or "offset" operation by A μm in the directions XYZ is carried out on this surface, "A" being, for example, 400 μm in XYZ; and the core is then placed at a distance in Z of B μm (B being able to be, for example, 135 μm) plus the polymerization depth measured for the paste and the parameters involved. The polymerization depth is the paste depth which will be polymerized by a passage of the laser. The polymerization depth depends on the paste which is used as well as on the laser parameters which are used: power, hatching gap, laser scanning speed. In order to manufacture cores made of alumina, the polymerization depth "B" is about 125 µm.

FIGS. 5 and 6 of the accompanying drawing illustrate the manufacturing of a core NF at an angle on a support S, the imprint being designated by the letter "E".

The angle α of inclination of the support with respect to the working platform is generally between 1 and 45°, more preferably between 15 and 25°, and most preferably 20°.

State of the Art for Firing Foundry Cores

The foundry cores obtained without any support according to (1) and (2) above are fired in sand at a temperature generally of about 1,300° C., which sand:

allows the homogenization of the temperature and the equalization of the pressure around the core, maintaining the shape of the piece at high temperature, thus avoiding distortions;

allows to suck the organic material therein by capillarity.

However, it is necessary that the green foundry core is rigid so as to avoid the distortion in the sand at room temperature and at low temperature. However, a great rigidity in the green state can only be obtained with a high laser power, which one may cause the aforementioned "curling" phenomenon.

With such a technique and a foundry core not being enough rigid, the differences with respect to the dimensions are, for example, from ±0.8 mm to 1.2 mm.

In order to fire a core on a support, the green foundry core is placed on its imprint, which limits distortions on its lower face because the creeping of the firing is controlled on such a face. However, the upper face of the core is not protected from distortions, which one can nevertheless be subjected to an uncontrolled creeping, the core then being able to bend, as illustrated in FIG. 7 of the accompanying drawing. With such a technique, the differences with respect to the dimensions are, for example, from ±0.4 mm to 0.6 mm.

The purpose of the present invention is to solve the issues related to the techniques which have just been set forth in order to provide a method which allows to manufacture pieces made of ceramic material, in particular foundry cores made of ceramic material, complying with the sizing, while avoiding any distortion of the pieces during manufacturing, cleaning and/or firing.

To this end, according to the present invention, it is provided to manufacture the core on its support and to manufacture, at the same time, a piece which is called a "shaper", which one has, in its upper face once manufactured, an imprint of the face of the core opposed to the face cooperating with the imprint formed in the support.

The support, the core and the shaper are made of the same material.

During the firing, the shaper is turned over in order for the core to be placed on it, the support then being placed on the core, which one is thus clamped between the support and the shaper. The core is maintained in the right shape thanks to the pressure applied by the support and the shaper. The cores being manufactured on a support, they may have a low rigidity, thus being able to become distorted without breaking. The core keeps its dimensions after sintering.

The subject of the present invention is therefore a method for manufacturing a piece made of ceramic material by the technique of additive manufacturing or stereolithography, said piece being formed in the green state from a photocurable ceramic composition comprising a ceramic powder and an organic portion able to be destroyed by heating during the debinding and including at least one photocurable monomer and/or oligomer and at least one photoinitiator, and then being subjected to debinding and sintering operations, characterized in that:

on a working platform of a stereolithography machine, is manufactured, by the technique of additive manufacturing, simultaneously but separately, from a same pasty photocurable ceramic composition:

a green assembly made up of a support of the green piece and of said green piece on said support, the free surface of the latter bearing the imprint of a first face of said green piece, said imprint made in said support having a surface shifted in XYZ but equivalent to said first face of said green piece so as to allow it to be received in said support and the spacing between both being filled with pasty material able to be removed once said green assembly is formed; and a green shaper made up of a piece made of ceramic material the free surface of which bears the imprint of a second face of said green piece opposed to said first face, said imprint made in said shaper having a surface shifted in XYZ but equivalent to said second face of said green piece so as to allow it to be received in said shaper;

in an oven, is placed, on said green shaper thus obtained with its imprint turned upwards, said green assembly thus obtained with its green piece turned downwards in order for it to be received in the imprint of said shaper, and the green piece thus held between the shaper and the support is subjected to debinding and to sintering, the imprints of the support and of the shaper being such that the piece is completely enclosed between them during the debinding and sintering operations.

The photocurable ceramic composition is photocured by laser or by a UV source.

The sinterable ceramic material is especially selected among alumina ($Al_2O_3$), zirconia ($ZrO_2$), alumina-toughened zirconia, zirconia-toughened alumina, zircon ($ZrSiO_4$), silica ($SiO_2$), hydroxyapatite, zircon-silica ($ZrSiO_4+SiO_2$), silicon nitride, tricalcium bis(phosphate) (TCP), aluminum nitride, silicon carbide, cordierite and mullite. Such a material is thermal shock-resistant.

The imprint of the support can advantageously correspond to a surface shifted by 100 to 600 µm in XYZ of said first face of the green piece. The imprint of the shaper can advantageously correspond to a surface shifted by 20 to 80 µm in XYZ of said second face of the green piece. In such conditions, the shaper has a surface which is closer to that of the piece. By placing the piece on the shaper and the support on top thereof, the piece is compressed on the face of the shaper which is more "accurate" than that of the support.

The support, the piece and the shaper have the same shrinking during the firing (at a temperature of about 1,300° C.) because they are made of the same material.

With the method according to the present invention, the difference with respect to the dimensions can be reduced to ±0.2 mm.

Advantageously, the green piece is manufactured at an angle on the support, the angle of inclination of the support with respect to the platform being between 1 and 45°, preferably between 15 and 25° and, particularly preferably, being 20°.

The support can be formed by being passed through by at least one hole leading to its imprint and allowing a solvent to pass through with a view to removing the uncured pasty material after the formation of the support-green piece assembly. Such holes can be holes with a circular cross section, for example, with a diameter between 2 and 8 mm, being, for example, 4 mm.

Advantageously, several holes advantageously distributed over the entire support are provided.

When cleaning the green piece in its support in order to remove the paste comprised between the piece and the support, the operator can therefore pass cleaning solvent through such holes, the paste to be removed then beginning to partially solubilize, facilitating the detachment of the green piece.

The support can be formed so as to be provided with at least one cavity in its wall opposed to that bearing the imprint of the green piece, the one or more cavities being likely to be filled with a ballast material, such as sand or beads, when the support is in firing position.

Such a ballast material allows, when it is placed in the cavities of the support, which one is located on the green piece during the firing, to provide an additional pressure on the green piece in order to control the creeping thereof. The shape and the number of cavities can vary and the cavities can be filled unequally if the creeping on only certain areas of the green piece is desired to be controlled.

In the event of cleaning holes being made in the support, needless to say that such holes should be plugged for the application of the additional pressure or that, if beads are used as a ballast material, the diameter thereof should be greater than the section of the cleaning holes.

In the event of the cavities not being filled with ballast material and of cleaning holes being provided, these ones therefore serve, during the firing, as a chimney to facilitate the discharge of organic materials.

The support and the green piece and/or the platform and the support can be linked by anti-curling studs formed during the manufacturing in the areas of the green piece which are inclined to curling, the studs being able to have a diameter between 50 and 800 µm, more preferably between 300 and 400 µm. Such studs which prevent the flat surfaces from bending are broken when the green piece is detached from its support.

According to a first embodiment of the method according to the invention, at the manufacturing step, successive layers of photocurable ceramic composition are formed, which ones are each time caused to be cured by irradiation according to the pattern previously defined from the model for said layer, and after the manufacturing step, the green assembly and the green shaper are subjected to a cleaning step so as to remove the uncured photocurable composition, especially allowing the green piece to be detached from its support.

According to a second embodiment of the method according to the invention, at the manufacturing step, the following steps are carried out to form hollow parts of the green support-piece assembly, in particular to form the space between the support and the piece and hollow parts within the piece:

forming, through machining, at least one recess in at least one cured photocurable ceramic composition layer from the upper surface thereof;
  depositing in said one or more recesses to fill it/them with a sacrificial organic material able to be cured and to be destroyed by heating during the debinding; and
  curing the sacrificial organic material to obtain a hard horizontal surface at the same level as the nearby cured ceramic composition layer, each time one or more recesses are formed, this/these one(s) being delimited according to the one or more patterns previously defined from the computer model, and its depth(s) selected to ensure the continuity of the piece to be manufactured, and once the cured layers are stacked up, a green support-piece assembly is obtained, which one can be subjected to a cleaning operation to remove the one or more uncured parts, the green piece being detached from its support during the debinding.

The sacrificial organic material advantageously consists in the photocurable composition used for the formation of the piece but without the one or more ceramic materials.

According to a particular embodiment of the method according to the present invention, at the manufacturing step, are formed, on the one hand, a support/green piece/ (support/green piece), stack, n being an integer such as 1, 2, 3, and, on the other hand, a shaper, and at the firing step, the shaper/green piece/support/(green piece/support), stack is formed, the opposite faces of each support intended to cooperate with the green pieces bearing, one, the imprint of a face of said green piece, and, the other, the imprint of the opposite face of said green piece.

The green piece obtained by the method according to the present invention is, for example, a foundry core.

To better illustrate the subject-matter of the present invention, several particular embodiments will be described hereinafter, by way of example and not limitation, with reference to the accompanying drawing.

In this drawing:

FIG. 5 is an exploded perspective schematic view of a support having an angled upper surface and of a foundry core intended to be placed on its imprint formed in the angled upper surface;

FIG. 6 is a view corresponding to FIG. 5 with the core placed on its support;

FIG. 7 shows, from the side, a support having an angled surface forming an imprint having received the foundry core, which one bent during the firing because of the uncontrolled creeping on the upper face of the green piece;

FIG. 8 shows, in perspective, a manufacturing platform of a stereolithography machine on which a support-piece assembly and a shaper were manufactured simultaneously, according to the invention;

FIG. 15 is a view similar to the right part of FIG. 13, with the support of FIG. 14;

FIG. 16A shows the support substantially as shown as in the right part of FIG. 14 but made according to a variant; and FIG. 16B is, on a larger scale, a view of the detail of FIG. 16A which constitutes the variant in question.

Figure 1:
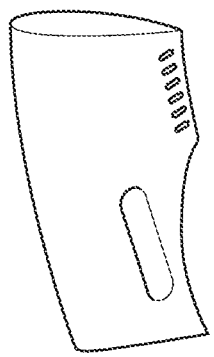
FIGS. 1 and 2 are, respectively, simplified and schematic representations of a foundry core having a complex and precise shape and a smooth surface, such a core being used for the casting of a turbine blade.
Figure 2:
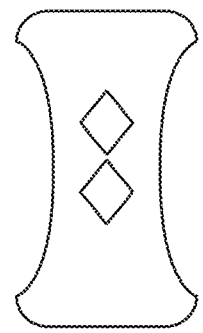
Figure 3:
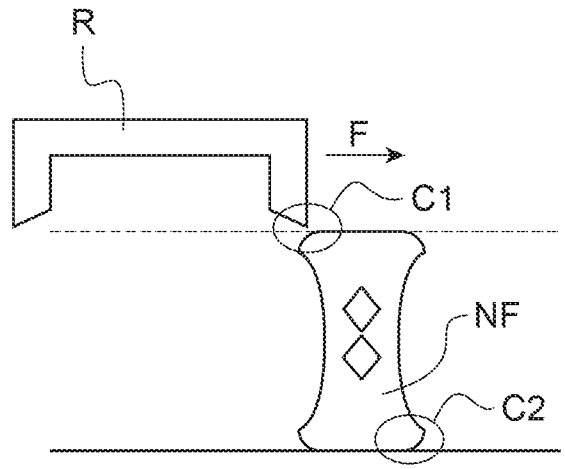
FIG. 3 is a diagram illustrating the curling phenomenon, phenomenon which can be observed in the known upright manufacturing of cores.
Figure 3:
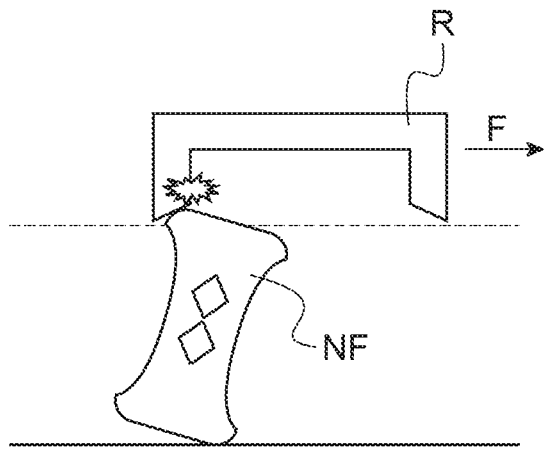
Figure 4:
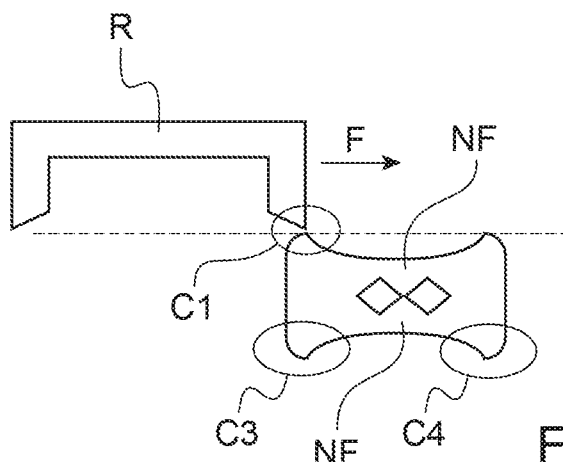
FIG. 4 is a diagram illustrating the detachment and sliding phenomenon of the core, phenomenon which can be observed in some cases, for example, when the irradiation energy becomes too high.
Figure 4:
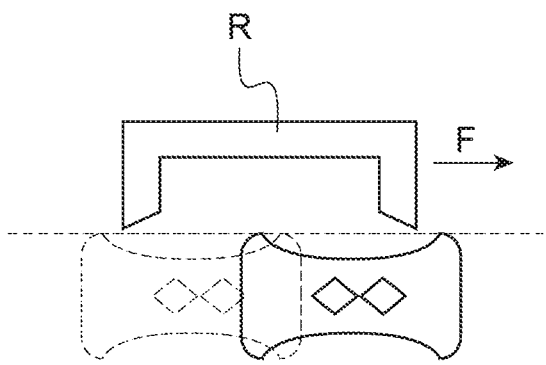

When referring to FIG. 5, it can be seen that a support S and a foundry core NF are shown in an exploded view. The support S has an upper surface which is tilted at an angle α with respect to the horizontal plane and in which an imprint E is formed for the lower face of the foundry core NF.

For the CAD manufacturing of the support S, the lower surface of the foundry core NF is transferred onto the angled face of the support S so as to create an imprint E; an "offset" operation in XYZ, that is to say a shift in the directions X, Y, Z, by 400 μm for example, is carried out on such a face; the foundry core is then placed at a distance in Z or a space between the support S and the lower face of the foundry core which can be 135 μm plus the polymerization depth, the polymerization depth being the paste depth which will be polymerized by a passage of the laser. The polymerization depth depends on the paste which is used as well as on the laser parameters: power, hatching gap, laser scanning speed. In order to manufacture foundry cores made of alumina, the polymerization depth is generally 125 μm or about 125 μm.

FIG. 6 shows the foundry core NF, with recesses Re formed upon the foundry core NF through machining, in place on its support S.

FIG. 7 illustrates that, during the firing, the foundry core NF bent because of the uncontrolled creep on its upper face.

FIG. 8 shows a manufacturing platform 1 of a stereolithography machine on which were simultaneously manufactured, according to the invention:
 a support 2—foundry core 3 assembly; and
 a shaper 4.

Thus, the shaper 4 according to the invention is manufactured next to the support 2 and to the foundry core 3. The manufactured foundry core 3—support 2 combination is only used once, having no role when manufacturing the foundry core 3. It allows to handle and to fire the foundry core 3 with no distortion or breakage.

Figure 9:
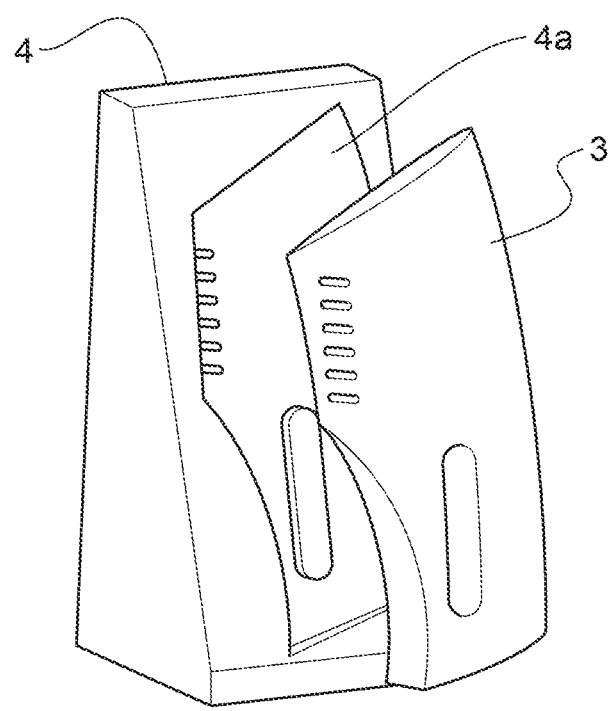
FIG. 9 is an exploded perspective view showing the piece and the shaper.

In FIG. 9, it can be seen the shaper 4 which takes the same form as the support 2 with an angled face in which an imprint 4a is formed for the upper face of the foundry core 3.

For the CAD manufacturing of the shaper 4, the upper surface of the foundry core 3 is transferred onto the angled face of the shaper 4 so as to create the imprint 4a; an "offset" operation in XYZ, that is to say a shift in the directions X, Y, Z, by 50 μm for example, is carried out on such a face, the offset being less important than for the creation of the support 2. The shaper 4 therefore has a surface which is closer to the surface of the foundry core 3.

Figures 10, 11:
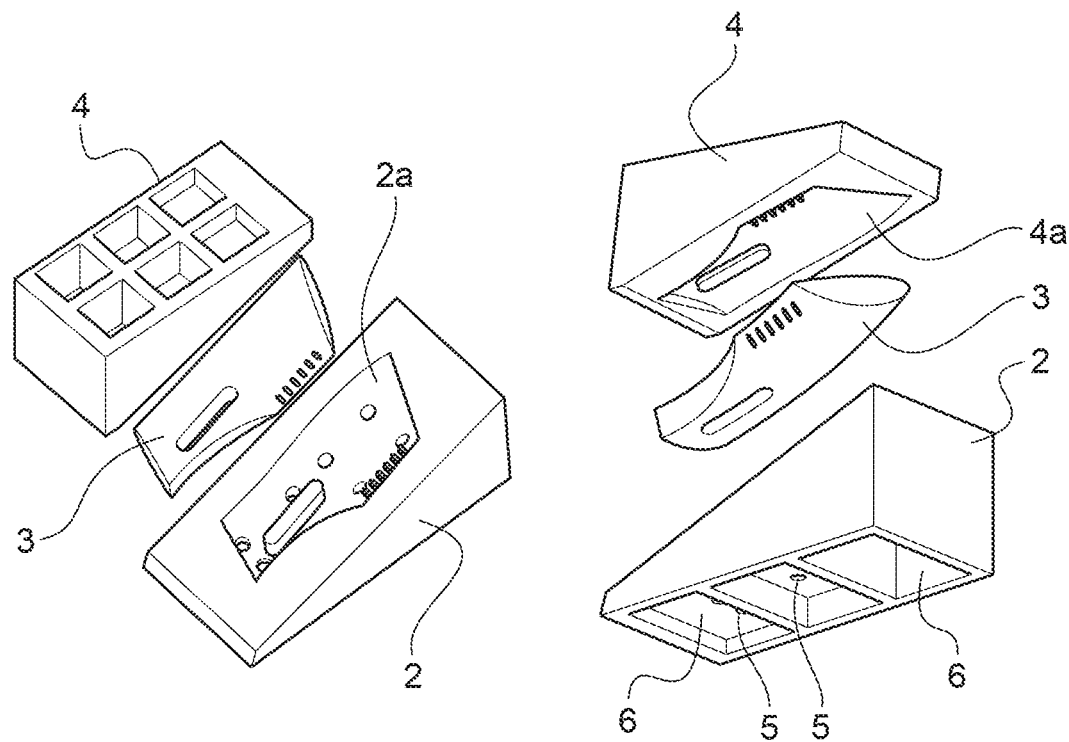
FIGS. 10 and 11 are exploded perspective views of the support, the piece and the shaper in inverted positions.

FIGS. 10 and 11 show in an exploded view and in two different directions:
 the support 2 with its imprint 2a (which can be seen in FIG. 10) for the lower face of the core;
 the foundry core 3;
 the shaper 4 with its imprint 4a (which can be seen in FIG. 11) for the upper face of the foundry core.

It can be seen that such a configuration according to the invention comprising the firing shaper 4 allows the foundry core 3 to be protected both by the support 2 and the shaper 4 when cleaning and handling, the distortions of the foundry core 3 during such steps being alleviated.

Figure 12:
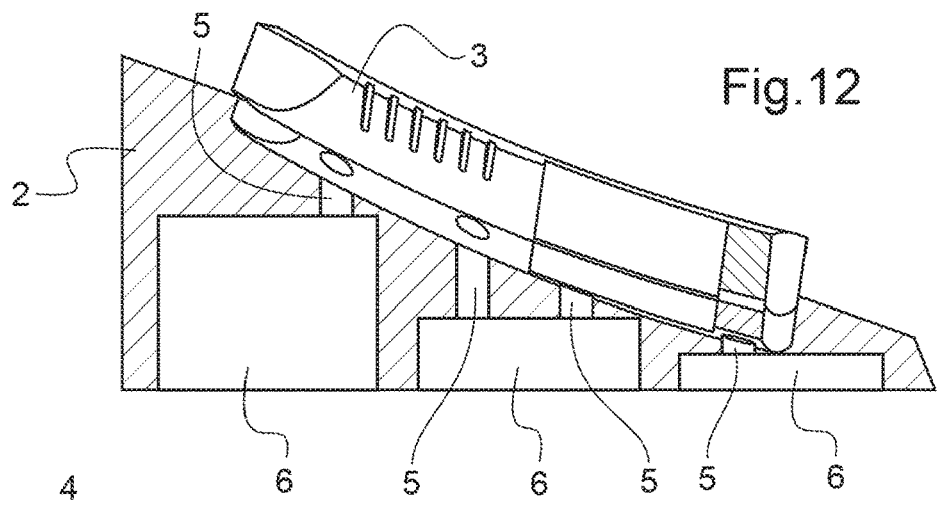
FIG. 12 is a side cross-sectional view of the piece on its support.

FIG. 12 shows, on a larger scale, a cross-sectional view of the foundry core 3 during the manufacturing on its support 2, the space between the support 2 and the lower face of the foundry core 3 having been deliberately exaggerated in this view. Such a space is as described when referring to FIG. 5.

Figure 13:
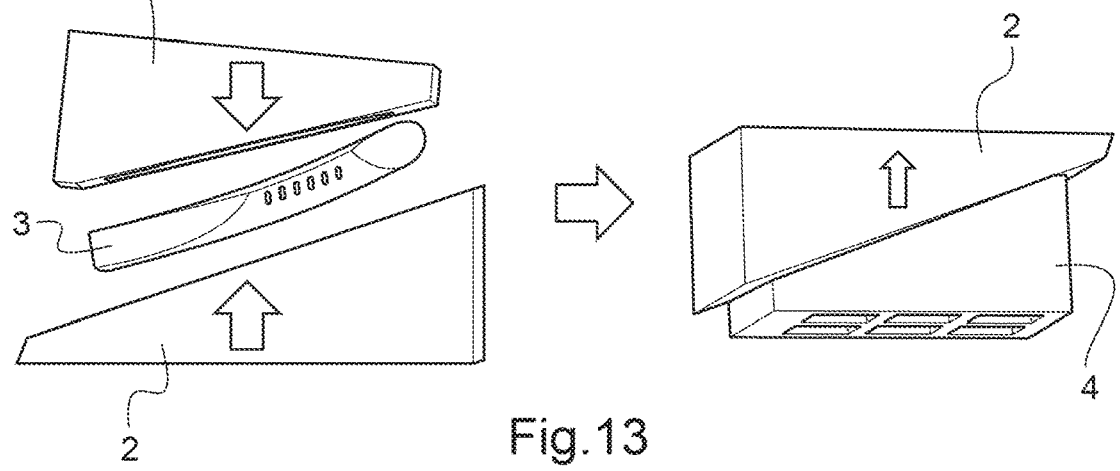
FIG. 13 illustrates the positioning of the support, the piece and the shaper for the firing.

As illustrated in FIG. 13, for the firing, the foundry core 3 is detached from its support 2 by debinding and sintered in a clamped way between the shaper 4 and the support 2, the shaper 4 being down, the foundry core 3, placed on the latter, and the support 2, placed on the foundry core 3 as it can be seen in the right part of FIG. 13.

The foundry core is thus maintained in the right shape thanks to the pressure applied by the support 2 and the shaper 4.

By placing the foundry core 3 on the shaper 4 and the support 2 on top thereof, the foundry core 3 is compressed on the face of the shaper 4 which is more "precise" than that of the support 2.

The foundry core 3 keeps its dimensions after sintering, because the three pieces 2, 3 and 4 have the same shrinking, being made of the same material.

With such a technique, the difference with respect to the dimensions is reduced to more or less 0.2 mm.

Furthermore, with such a technique, low rigidity pieces can be distorted without breaking.

Figure 14:
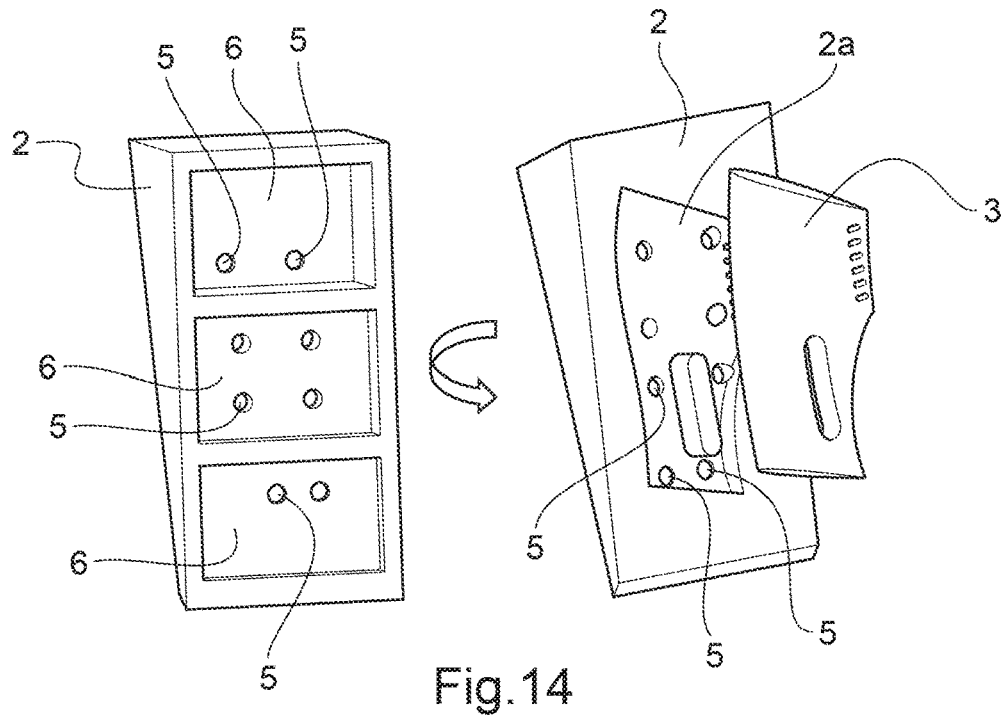
FIG. 14 shows, in its left part, the rear face of a support made according to a particular embodiment of the present invention, and, in its right part, in an exploded view, said support viewed in its front part and the piece.

When referring to FIG. 14, it can be seen that the support 2 was made according to a variant which comprises holes 5 which go through it in several places, leading to the imprint 2a. The diameter of such holes 5 can be between 2 and 8 mm, being for example 4 mm.

When cleaning, the operator can pass cleaning solvent through such holes 5, the paste comprised between the foundry core 3 and the support 2 beginning to partially solubilize, facilitating the detachment of the foundry core 3.

As it can also be seen in FIG. 14 and also in FIG. 15, the support 2 can be made according to another variant which comprises, in its surface which is opposed to the angled surface and which is intended to be on top thereof during the firing (FIG. 15), cavities 6, here three in number and with a square shape, which are intended to receive beads or sand during the firing in order to provide an additional pressure on the foundry core 3, and thus to control the creeping of the latter during the firing.

The support 2 shown in FIGS. 14 and 15 also comprises holes 5, which ones lead to the bottom of the cavities 6.

The beads inserted into the cavities 6 should have a diameter greater than that of the holes 5. If sand or small beads are used, the holes 5 should be plugged.

The shape and the number of cavities 6 can vary. The cavities 6 can be filled unequally if the creeping of the foundry core 3 on only certain areas thereof is desired to be controlled.

If cleaning holes 5 remain free during the sintering, they will serve as a chimney to facilitate the discharge of organic materials.

Now, when referring to FIGS. 16A and 16B, it can be seen that is shown a variant of the support 2 which comprises, in the bottom of the imprint 2a, an area comprising anti-curling studs 7, such studs linking the foundry core 3 being manufactured and the support 2 and being intended to prevent the flat surfaces of the foundry core 3 from bending. Their diameter can be between 50 and 800 μm, especially between 300 and 400 μm. The studs 7 are broken when the foundry core 3 is detached from the support 2.

In FIGS. 10 and 11 as well as 13 (right part), it can be seen that the shaper 4 has, in its base, cavities of the type of the cavities 6 of the support 2. Such cavities shown in the shaper 4 only have the function to limit the ceramic thicknesses with a view to facilitating the firing. Here, they are optional.

The invention claimed is:

1. A method for manufacturing a piece made of ceramic material by additive manufacturing or stereolithography, comprising:

forming said piece in a green state from a photocurable ceramic composition comprising a ceramic powder and an organic portion able to be destroyed by heating during debinding and including at least one photocurable monomer and/or oligomer and at least one photoinitiator;

manufacturing, on a working platform (1) of a stereolithography machine by additive manufacturing, simultaneously but separately, and from a pasty photocurable ceramic composition:

a green assembly, formed of a support (2) of the green piece and of said green piece located on the support (2), a free surface of the support bearing a first imprint (2a) of a first face of said green piece, said first imprint (2a) being shifted in space but equivalent to said first face of said green piece so as to allow said first face to be received in said support (2), and a spacing between the first face and the support being filled with pasty material able to be removed once said green assembly is formed, and a green shaper (4) formed of a piece made of ceramic material that has a free surface that bears a second imprint (4a) of a second face of said green piece opposed to said first face, said second imprint (4a) having a surface shifted in space but equivalent to said second face of said green piece so as to allow said second face to be received in said shaper (4);

placing, in an oven, and on said green shaper (4) thus obtained with the second imprint (4a) turned upwards, said green assembly thus obtained with the green piece turned downwards in order for the green piece to be received in the second imprint (4a) of said shaper (4); and subjecting the green piece thus held between the shaper (4) and the support (2) to debinding and sintering operations, the first and second imprints being such that the piece is completely enclosed between them during the debinding and sintering operations, wherein the support (2) includes at least one hole (5) passing through the support (2) to the first imprint (2a) for allowing passage of a solvent for removal of uncured pasty material after the formation of the support-green piece assembly, the at least one hole (5) having a circular cross section.

2. The method according to claim 1, wherein the first imprint (2a) of the support (2) corresponds to a surface shifted by 100 to 600 μm in space of said first face of the green piece.

3. The method according to claim 1, wherein the second imprint (4a) of the shaper (4) corresponds to a surface shifted by 20 to 80 μm in space of said second face of the green piece.

4. The method according to claim 1, wherein the green piece is manufactured at an angle on the support (2), the angle of inclination of the support with respect to the platform (1) being between 1 and 45°.

5. The method according to claim 1, wherein the support (2) is formed so as to be provided with at least one cavity (6) in a wall of the support, said wall being opposite to a wall of the support that bears the first imprint (2a) of the green piece in order to be filled with a ballast material when the support (2) is in a firing position.

6. The method according to claim 1, wherein the support (2) and the green piece and/or the platform (1) and the support (2) are linked by anti-curling studs (7) formed during manufacturing in areas of the green piece which are inclined to curling, the studs (7) having a diameter between 50 and 800 μm.

7. The method according to claim 1, wherein, during the manufacturing step, successive layers of photocurable ceramic composition are formed, each layer caused to be cured by irradiation according to a pattern previously defined from a model for said layer, and after the manufacturing step, the green assembly and the green shaper (4) are subjected to a cleaning step so as to remove uncured photocurable composition.

8. The method according to claim 1, wherein, during the manufacturing step, the following steps are carried out to form hollow parts of the green assembly as space between the support and the piece and hollow parts within the piece:

forming, through machining, at least one recess (Re) in at least one cured photocurable ceramic composition layer from an upper surface thereof;

depositing in said recess to fill the recess with a sacrificial organic material able to be cured and to be destroyed by heating during the debinding; and curing the sacrificial organic material to obtain a horizontal surface at a same level as a cured ceramic composition layer, wherein each time the at least one recess is formed, the at least one recess being delimited according to one or more patterns previously defined from a computer model, and a depth is selected to ensure continuity of the piece to be manufactured, and wherein once the cured layers are stacked up, a green support-piece assembly is obtained, and the green piece being detached from its support during the debinding.

9. The method according to claim 1, wherein, at the manufacturing step, a stack of plural supports and green pieces is formed, and a shaper is formed, and at the firing step, a stack of plural shapers, green pieces, and supports is formed, opposite faces of each support configured to cooperate with corresponding green pieces.

10. The method according to claim 1, wherein the green piece is a foundry core.

11. The method according to claim 2, wherein the second imprint (4a) of the shaper (4) corresponds to a surface shifted by 20 to 80 μm in space of said second face of the green piece.

12. The method according to claim 4, wherein the angle of inclination of the support with respect to the platform (1) is between 15 and 25°.

13. The method according to claim 4, wherein the angle of inclination of the support with respect to the platform (1) is 20°.

14. The method according to claim 1, wherein the at least one hole (5) has a diameter between 2 and 8 mm.

15. The method according to claim 6, wherein the studs have a diameter between 300 and 400 μm.

16. The method according to claim 2, wherein the green piece is manufactured at an angle on the support (2), the angle of inclination of the support with respect to the platform (1) being between 1 and 45°.

17. The method according to claim 3, wherein the green piece is manufactured at an angle on the support (2), the angle of inclination of the support with respect to the platform (1) being between 1 and 45°.

\* \* \* \* \*